(12) United States Patent
Yamaguchi et al.

(10) Patent No.: US 8,348,008 B2
(45) Date of Patent: Jan. 8, 2013

(54) ELECTRIC POWER STEERING SYSTEM

(75) Inventors: Shigetoshi Yamaguchi, Okazaki (JP); Tomohiro Niwa, Okazaki (JP)

(73) Assignee: JTEKT Corporation, Osaka-Shi (JP)

( * ) Notice: Subject to any disclaimer, the term of this patent is extended or adjusted under 35 U.S.C. 154(b) by 389 days.

(21) Appl. No.: 12/588,586

(22) Filed: Oct. 20, 2009

(65) Prior Publication Data
US 2010/0101889 A1    Apr. 29, 2010

(30) Foreign Application Priority Data
Oct. 24, 2008   (JP) ................................ 2008-274593

(51) Int. Cl.
 *B62D 5/04*    (2006.01)
(52) U.S. Cl. ........................... 180/444; 180/446; 310/71
(58) Field of Classification Search .................. 180/443, 180/444, 446; 701/41; 310/71, 79
See application file for complete search history.

(56) References Cited

U.S. PATENT DOCUMENTS

| | | | |
|---|---|---|---|
| 6,838,844 B2* | 1/2005 | Shimizu et al. | 318/287 |
| 2002/0060105 A1* | 5/2002 | Tominaga et al. | 180/443 |
| 2003/0200018 A1* | 10/2003 | Arimura | 701/41 |
| 2004/0128042 A1* | 7/2004 | Takahashi et al. | 701/41 |
| 2004/0222035 A1* | 11/2004 | Yoneda et al. | 180/443 |
| 2005/0251311 A1* | 11/2005 | Burton et al. | 701/41 |
| 2009/0120712 A1* | 5/2009 | Kashimoto et al. | 180/444 |
| 2009/0133955 A1* | 5/2009 | Morikawa et al. | 180/444 |
| 2009/0272599 A1 | 11/2009 | Sekine et al. | |

FOREIGN PATENT DOCUMENTS

| | | |
|---|---|---|
| CN | 200939898 | 8/2007 |
| EP | 2 006 185 A2 | 12/2008 |
| EP | 2 017 160 A1 | 1/2009 |
| JP | A-2002-120739 | 4/2002 |
| JP | A-2007-276740 | 10/2007 |
| WO | WO 2007/119756 A1 | 10/2007 |

OTHER PUBLICATIONS

European Search Report issued in European Patent Application No. 09 17 3739 dated Feb. 10, 2011.
Aug. 29, 2012 Chinese Office Action issued in Application No. 200910207247.X (with English Translation).

* cited by examiner

*Primary Examiner* — Anne Marie M Boehler
(74) *Attorney, Agent, or Firm* — Oliff & Berridge, PLC

(57) ABSTRACT

In an electric power steering system, a motor drive controller that has an inverter circuit board and a control circuit board housed in a control case is provided so as to overlap a control case fixation surface formed at an end portion of a gear housing in the axial direction of a steering shaft, so that it is possible to reduce the projection in the axial direction of a motor as compared to the conventional one. In addition, a metallic board is used for the inverter circuit board and the inverter circuit board is fixed to the control case fixation surface so as to be in surface contact therewith, so that it is possible to efficiently dissipate the heat generated on the inverter circuit board into the gear housing and a fixation support plate.

11 Claims, 11 Drawing Sheets

ELECTRIC POWER STEERING SYSTEM

INCORPORATION BY REFERENCE

The disclosure of Japanese Patent Application No. 2008-274593 filed on Oct. 24, 2008 including the specification, drawings and abstract is incorporated herein by reference in its entirety.

BACKGROUND OF THE INVENTION

1. Field of the Invention

The invention relates to an electric power steering system.

2. Description of the Related Art

In an electric power steering system, a drive controller that controls drive of an alternating-current motor is disposed at a position distant from the alternating-current motor, such as in a cabin of a vehicle, and the alternating-current motor and the drive controller are connected to each other by a cable. In such an electric power steering system, the weight increases due to the weight of the cable and the cable in some cases picks up noise and adversely affects the drive controller. In order to solve these problems, an electric power steering system has been developed in which a cable is shortened or eliminated by integrating the drive controller into the alternating-current motor. Specifically, there are available a system in which the drive controller is disposed at a rear end portion of a stator of the alternating-current motor and a system in which the drive controller is disposed between a stator and a worm speed reducing mechanism. See Japanese Patent Application Publication No. 2002-120739.

In the above-described electric power steering system, however, because a stator and a drive controller are coaxially arranged on the same axis as the rotation axis of the alternating-current motor, the amount of projection in the direction of the rotation axis of the alternating-current motor is large.

SUMMARY OF THE INVENTION

An object of the invention is to provide an electric power steering system in which the amount of projection of an alternating-current motor is small and that is excellent in mountability.

An electric power steering system according to an aspect of the invention that assists steering of a steering wheel according to driving conditions includes: a rotary shaft that rotates with a steering wheel of a vehicle; a worm speed reducing mechanism, provided at a middle portion of the rotary shaft, the worm speed reducing mechanism including a worm wheel and a worm gear meshing with the worm wheel; a mechanism housing that includes a first housing portion that covers the worm wheel and a second housing portion that covers the worm gear, the second housing portion being integrally formed with the first housing portion on a side portion of the first housing portion; an alternating-current motor that drives the worm gear, the alternating-current motor being disposed coaxially with the worm gear and fixed to the second housing portion; a motor drive control circuit that includes a switching inverter circuit, connected to the alternating-current motor, and that controls the alternating-current motor; and a control case that houses the motor drive control circuit, wherein the mechanism housing has a control case fixation surface, on which the control case is fixed, at an end portion of the mechanism housing in the axial direction of the rotary shaft, wherein the control case fixation surface is sized so that the control case fixation surface fits in a rectangle that is the smallest rectangle that can be set in the plan view of the mechanism housing with respect to the axial direction of the rotary shaft and that has four sides, which are a pair of vertical sides that are parallel with the rotation axis of the worm gear and a pair of horizontal sides that are perpendicular to the vertical sides, in which four sides the first housing portion and the second housing portion are inscribed, wherein the control case includes: a loop-structured, closed-loop side wall that stands on the control case fixation surface; and a ceiling wall that closes an end portion opening, on a side distant from the control case fixation surface, of the closed-loop side wall, and wherein an inverter circuit board, on which the switching inverter circuit is implemented, is fixed so as to be placed on the control case fixation surface.

According to the above aspect, the control case that houses the motor drive control circuit is provided so as to overlap the control case fixation surface formed at an end portion of the mechanism housing in an axial direction of the rotary shaft, so that it is possible to reduce the projection of the alternating-current motor in the direction of the rotation axis thereof as compared to the conventional one.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
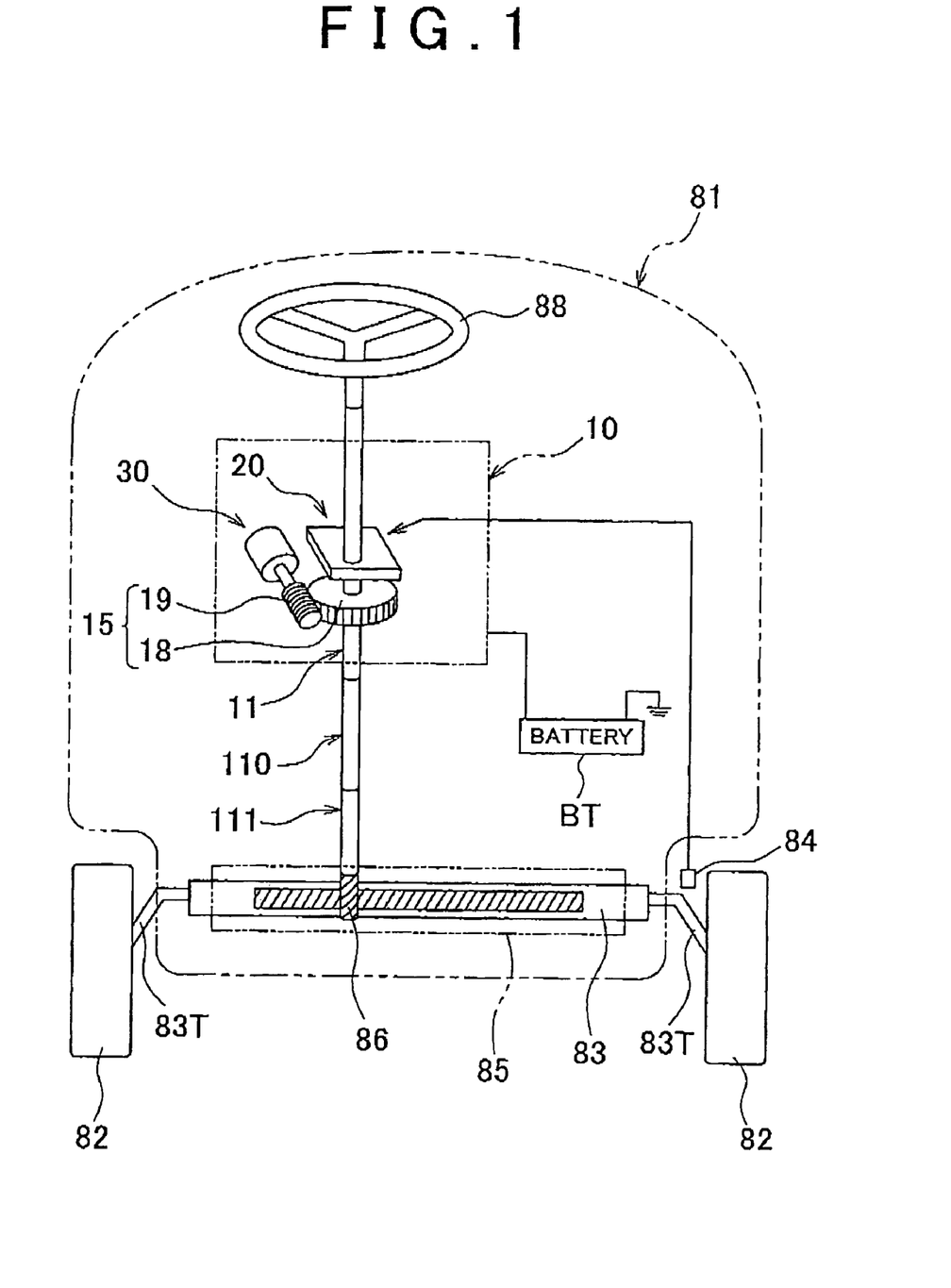
FIG. 1 is a schematic diagram of a vehicle, on which an electric power steering system according to an embodiment of the invention is mounted.

An embodiment of the invention will be described below with reference to FIGS. 1 to 11. FIG. 1 shows a vehicle 81, on which an electric power steering system 10 is mounted. A rack 83 is placed between a pair of steered wheels 82 of the vehicle 81 and is inserted into a cylindrical rack case 85. Each end of the rack 83 is connected to the steered wheel 82 through a tie rod 83T. The rack case 83 is fixed to a body of the vehicle 81. A vehicle speed sensor 84 for detecting a vehicle speed based on the rotation of the steered wheel 82 is provided near the steered wheel 82.

A pinion 86 laterally passing through a middle portion of a rack case 85 meshes with the rack 83. Between the pinion 86 and a steering wheel 88, a plurality of steering shafts 11, 110, and 111 are aligned and connected one after another via universal joints (not shown). The steering shafts 11, 110, and 111 transmit the rotation of the steering wheel 88 to the pinion 86.

As shown in FIG. 1, the electric power steering system 10 of this embodiment is configured to apply an assist torque from an alternating-current motor 30 (hereinafter referred to as the "motor 30") to, among the plurality of steering shaft 11, 110, and 111, the steering shaft 11 positioned near the steering wheel 88.

Specifically, a worm speed reducing mechanism 15 is installed on the steering shaft 11. The worm speed reducing mechanism 15 is entirely covered with a gear housing 40, which functions as the "mechanism housing" (see FIGS. 2 and 10), the gear housing 40 being fixed to the vehicle 81.

Figure 2:
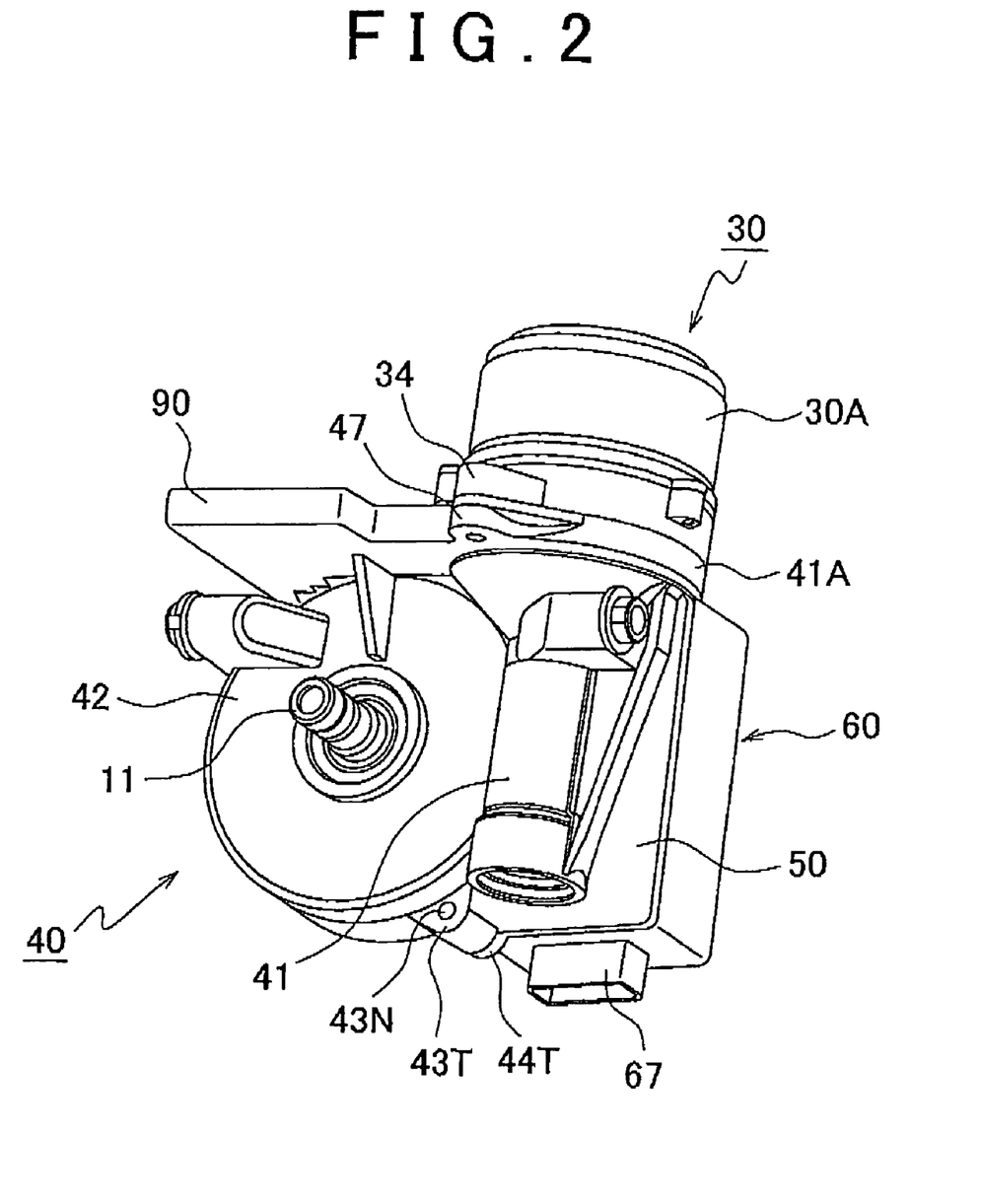
FIG. 2 is a perspective view of the electric power steering system.
Figure 3:
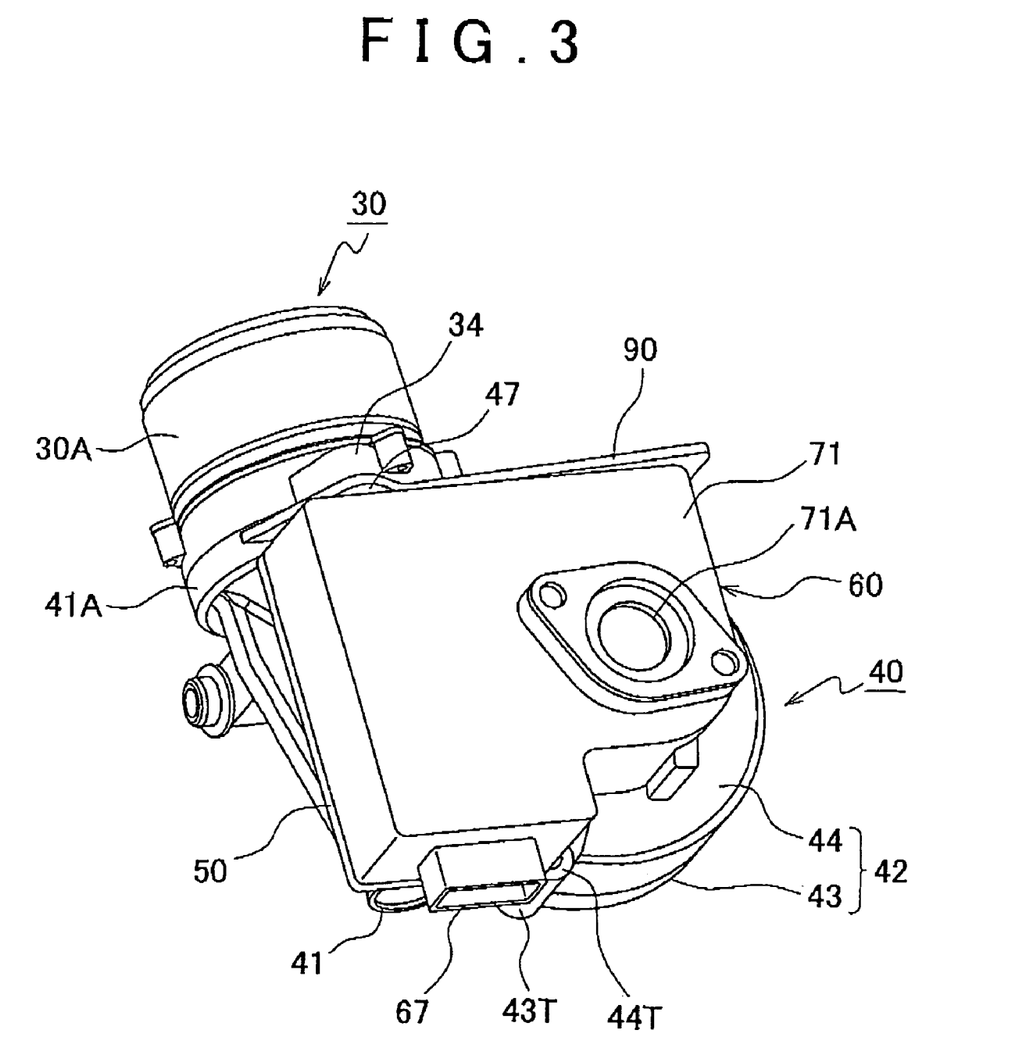
FIG. 3 is a perspective view of the electric power steering system.
Figure 10:
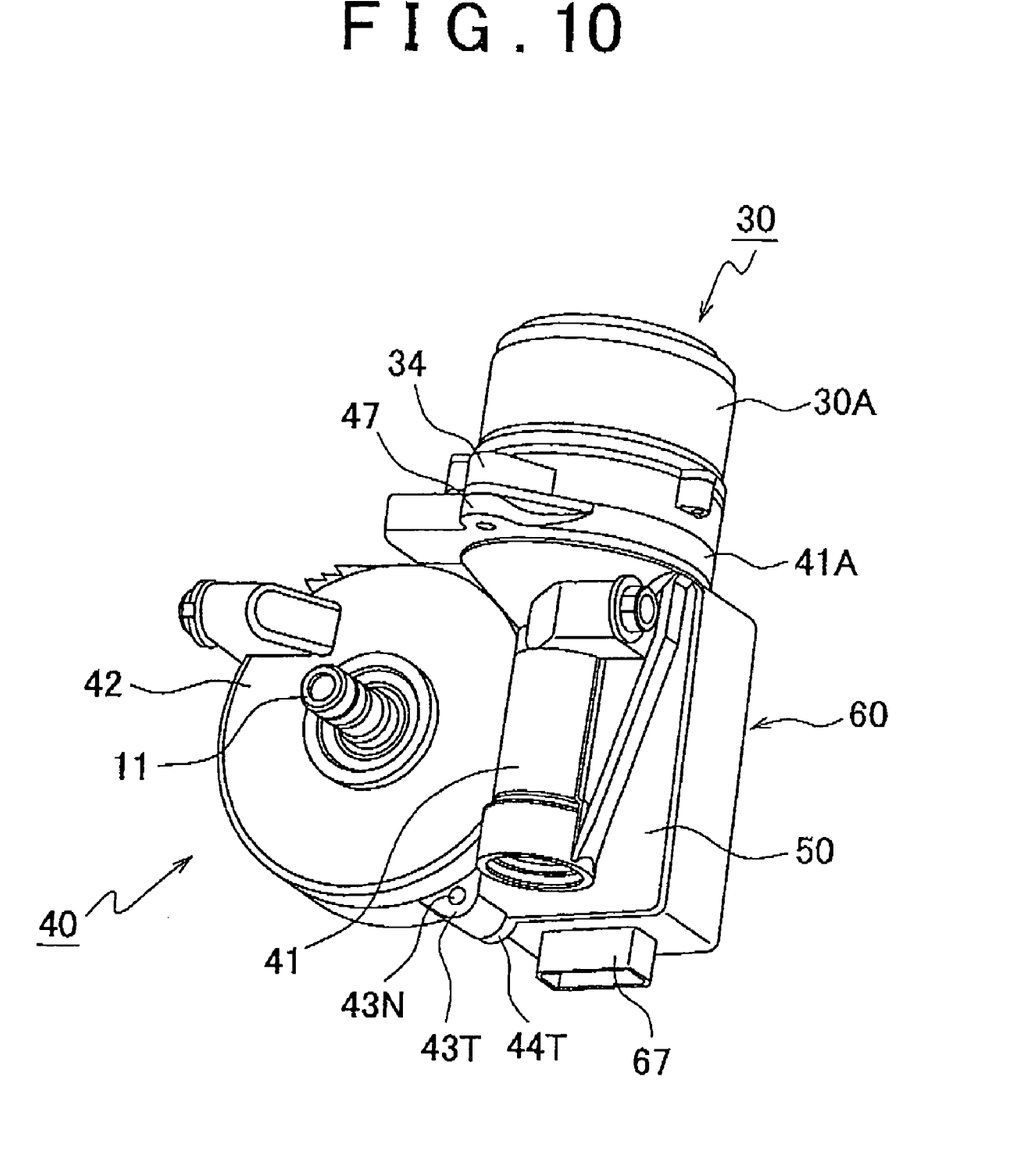
FIG. 10 is a perspective view of the electric power steering system.

The gear housing 40 is an aluminum casting, for example, and integrally includes: a flat, cylindrical worm wheel housing portion 42, which functions as the "first housing portion", with the steering shaft 11 centered as shown in FIGS. 2 and 10; and an elongated, cylindrical worm gear housing portion 41, which functions as the "second housing portion," the elongated, cylindrical worm gear housing portion 41 being disposed laterally next to the flat, cylindrical worm wheel housing portion 42. The steering shaft 11 passes through the center portion of the worm wheel housing portion 42. A worm wheel 18 (see FIGS. 1 and 4) fixed to the steering shaft 11 so as to be able to rotate with the steering shaft 11 is housed in the worm wheel housing portion 42. In addition, a worm gear 19 (see FIGS. 1 and 5) meshing with the worm wheel 18 is housed in the worm gear housing portion 41 and rotatably supported at each end of the worm gear 19.

Figure 5:
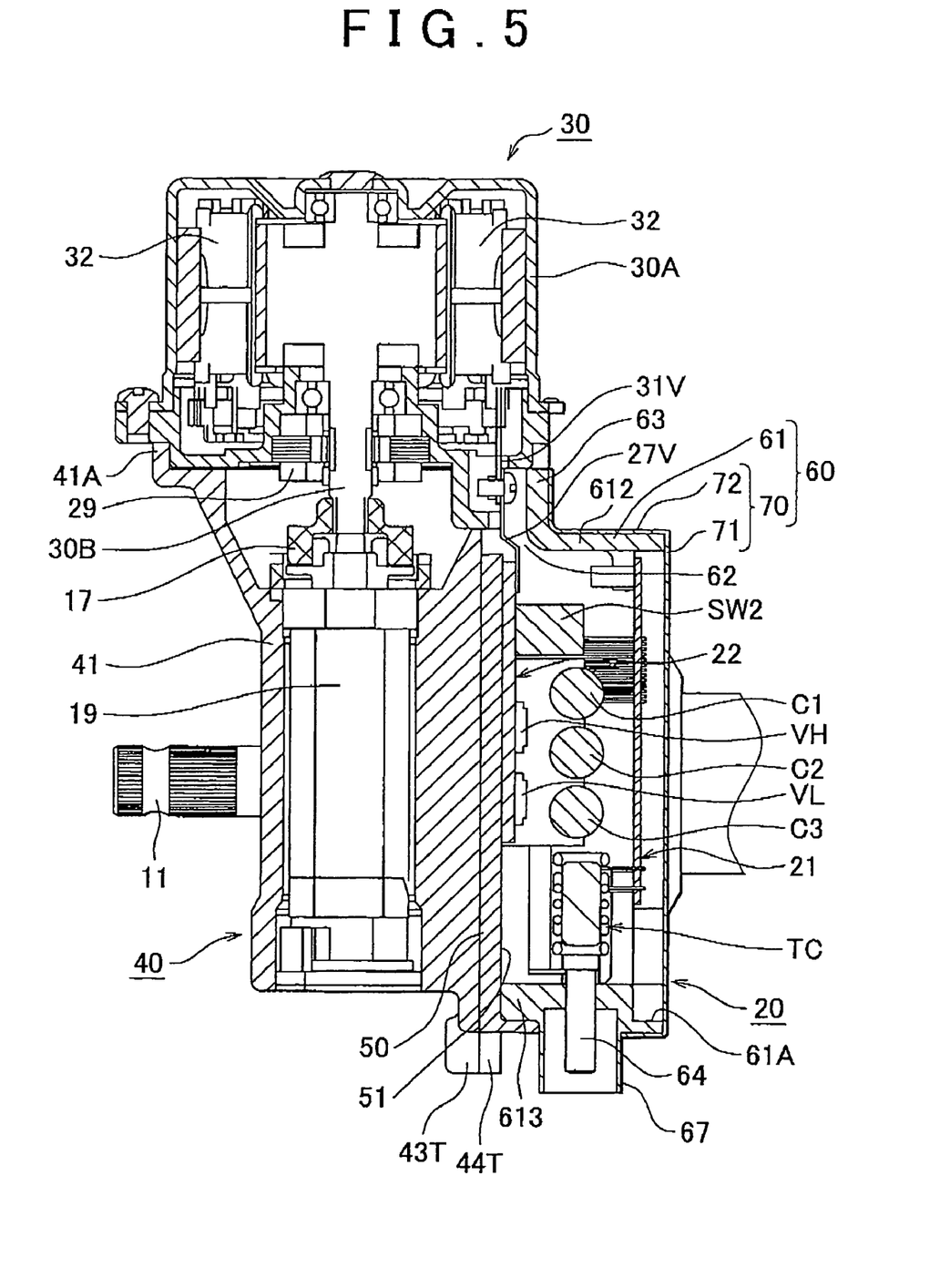
FIG. 5 is a sectional diagram taken along the line A-A of FIG. 4.

The worm gear housing portion 41 is increased in diameter, in the form of a conical cylinder, toward a motor-fixing cylindrical portion 41A formed at an axial end portion of the worm gear housing portion 41 and the motor 30 is attached so as to close the opening of the motor-fixing cylindrical portion 41A. As shown in FIG. 5, the motor 30 is provided with a rotary output shaft 30B protruding from the center of one end surface of a cylindrical stator 30A. As shown in FIGS. 2, 3, 10, and 11, a pair of motor fixing portions 34, 34 (only one of the motor fixing portions 34 is shown in FIGS. 2, 3, 10, and 11) project in opposite directions from the end portion, on the worm gear housing portion 41 side, of the outer circumferential surface of the stator 30A. On the other hand, a pair of motor fixing portions 47, 47 project in opposite directions also from the outer circumferential surface of the motor-fixing cylindrical portion 41A of the worm gear housing portion 41. The screws (not shown) that are passed through the motor fixing portions 34, 34 of the stator 30A are screwed into the female screw holes (not shown) formed in the motor fixing portions 47, 47 of the worm gear housing portion 41, whereby the motor 30 (stator 30A) is fixed to the gear housing 40 (worm gear housing portion 41).

The stator 30A contains U-, V-, and W-phase coils 32 and the terminals of the coils 32 of these phases are connected to terminal metal parts 31U, 31V, and 31W. The terminal metal parts 31U, 31V, and 31W are provided to be exposed to the outside of the stator 30A (see FIG. 8). As shown in FIG. 5, a rotational position sensor 29 (resolver) for detecting the rotational position θ2 of the rotary output shaft 30B is provided at the worm gear housing portion 41-side end portion of the stator 30A.

The rotary output shaft 30B extends into the worm gear housing portion 41 through the opening of the motor-fixing cylindrical portion 41A and is connected to the worm gear 19 through a coupling 17 so as to be able to rotate with the worm gear 19. Thus, the torque of the motor 30 is transmitted from the rotary output shaft 30B of the motor 30 to the worm gear 19.

As shown in FIGS. 2, 3, 10, and 11, a planar plate 90 perpendicular to the rotation axis of the motor 30 projects from the outer circumferential surface of the motor-fixing cylindrical portion 41A of the worm gear housing portion 41 and laterally covers the worm wheel housing portion 42. However, the plate 90 may be omitted and is therefore not shown in FIGS. 4 to 8, 10, and 11.

The worm wheel housing portion 42 of the gear housing 40 can be divided, at an intermediate position in the flattening direction, that is, at an intermediate position in the axial direction of the steering shaft 11, into a first housing-portion component body 43 and a second housing-portion component body 44 to enable the worm wheel 18 to be inserted into the worm wheel housing portion 42 for installation. A pair of fixing protrusions 43T are provided so as to project from the outer circumferential surface of the first housing-portion component body 43 in opposite directions (only one of the fixing protrusions 43T is shown in FIGS. 2, 3, 10, and 11). A female screw hole 43N is formed through each of the fixing protrusions 43T.

Figure 4:
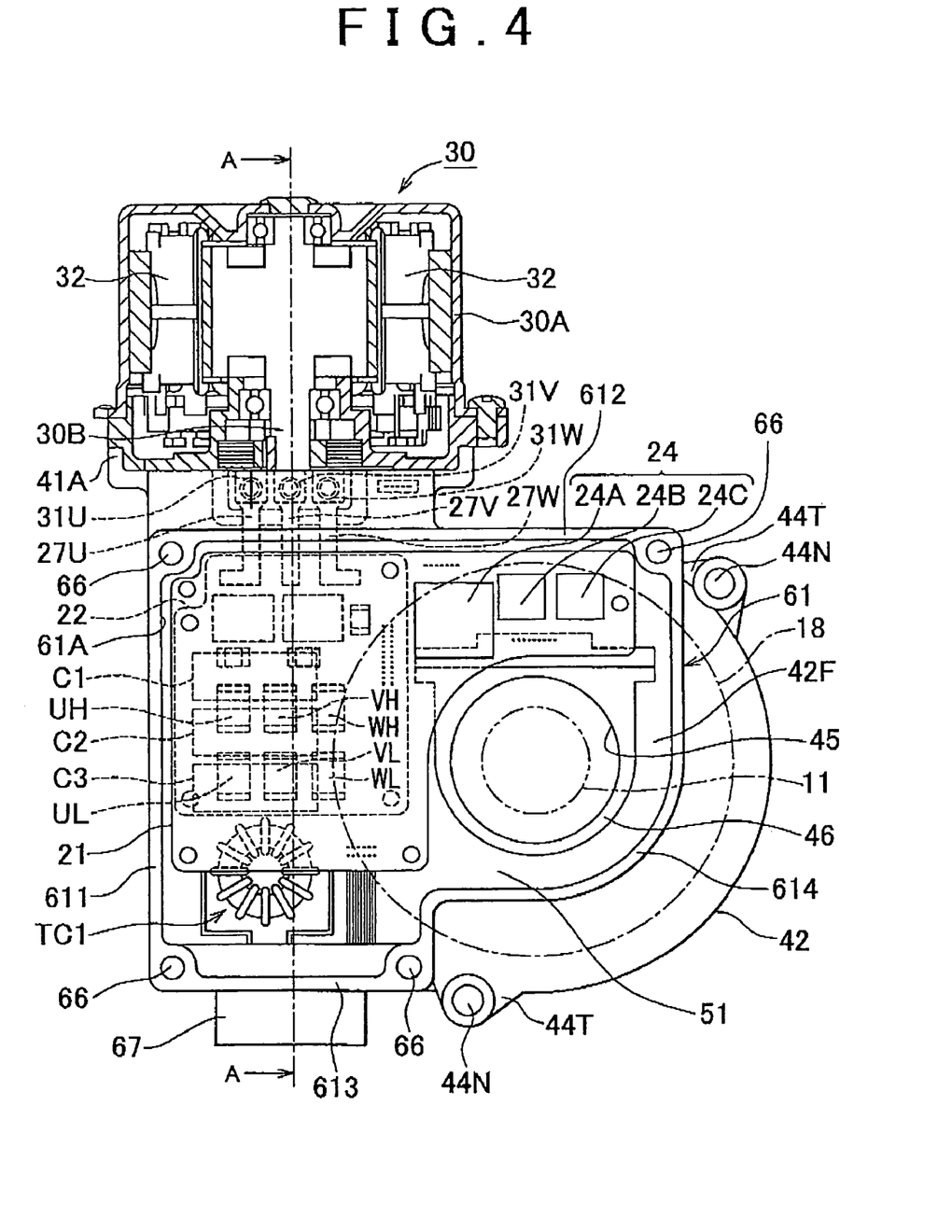
FIG. 4 is a sectional diagram of the electric power steering system.

On the other hand, as shown in FIG. 4, a pair of fixing protrusions 44T are provided so as to project from the outer circumferential surface of the second housing-portion component body 44 in opposite directions (only one of the fixing protrusions 44T is shown in FIGS. 2, 3, 10, and 11). A screw insertion hole 44N (see FIG. 4) is formed through each of the fixing protrusions 44T.

The screws (not shown) that are passed through the screw insertion holes 44N in the second housing-portion component body 44 are screwed into the female screw holes 43N in the first housing-portion component body 43, whereby the first and second housing-portion component bodies 43 and 44 are fixed to each other to form the worm wheel housing portion 42.

A circular shaft insertion hole 45, through which the steering shaft 11 is passed, is formed in the second housing-portion component body 44. A sensor housing cylinder portion 46, which functions as the "shaft middle portion surrounding wall", is provided so as to project from the edge portion of the opening of the circular shaft insertion hole 45 to the upper end side of the steering shaft 11. The sensor housing cylinder portion 46 has a cylindrical structure that is short in the vertical direction. In the sensor housing cylinder portion 46, a steering angle/torque sensor 87 (see FIG. 9) that detects the steering angle of the steering wheel 88 and the steering torque of the steering shaft 11 is housed. Outside the sensor housing cylinder portion 46, terminal pins 46P are provided so as to output the result of detection by the steering angle/torque sensor 87.

In order to shorten or eliminate the cable for connecting between the motor 30 and the motor drive controller 20, in the electric power steering system 10 of this embodiment, the motor drive controller 20 is disposed so as to overlap the gear housing 40 when viewed in the axial direction of the steering shaft 11, and the motor drive controller 20 and the gear housing 40 are integrated together. Thus, a fixation support plate 50 is integrally formed with the gear housing 40 described above.

The fixation support plate 50 projects from a side surface of the second housing-portion component body 44 of the worm wheel housing portion 42 on the worm gear housing portion 41 side. The fixation support plate 50 has a plate shape perpendicular to the steering shaft 11 and parallel with the worm gear housing portion 41 and covers the whole worm gear housing portion 41 from above (from the steering wheel 88 side) (see FIGS. 2, 8, and 10). An upper surface 50F, facing the steering wheel 88 side, of the fixation support plate 50 is a flat surface that is flush with an upper surface 42F of the worm wheel housing portion 42, the upper surface facing the steering wheel 88 side. The upper surface 50F of the fixation support plate 50 and the upper surface 42F of the worm wheel housing portion 42 form a control case fixation surface 51.

Figure 8:
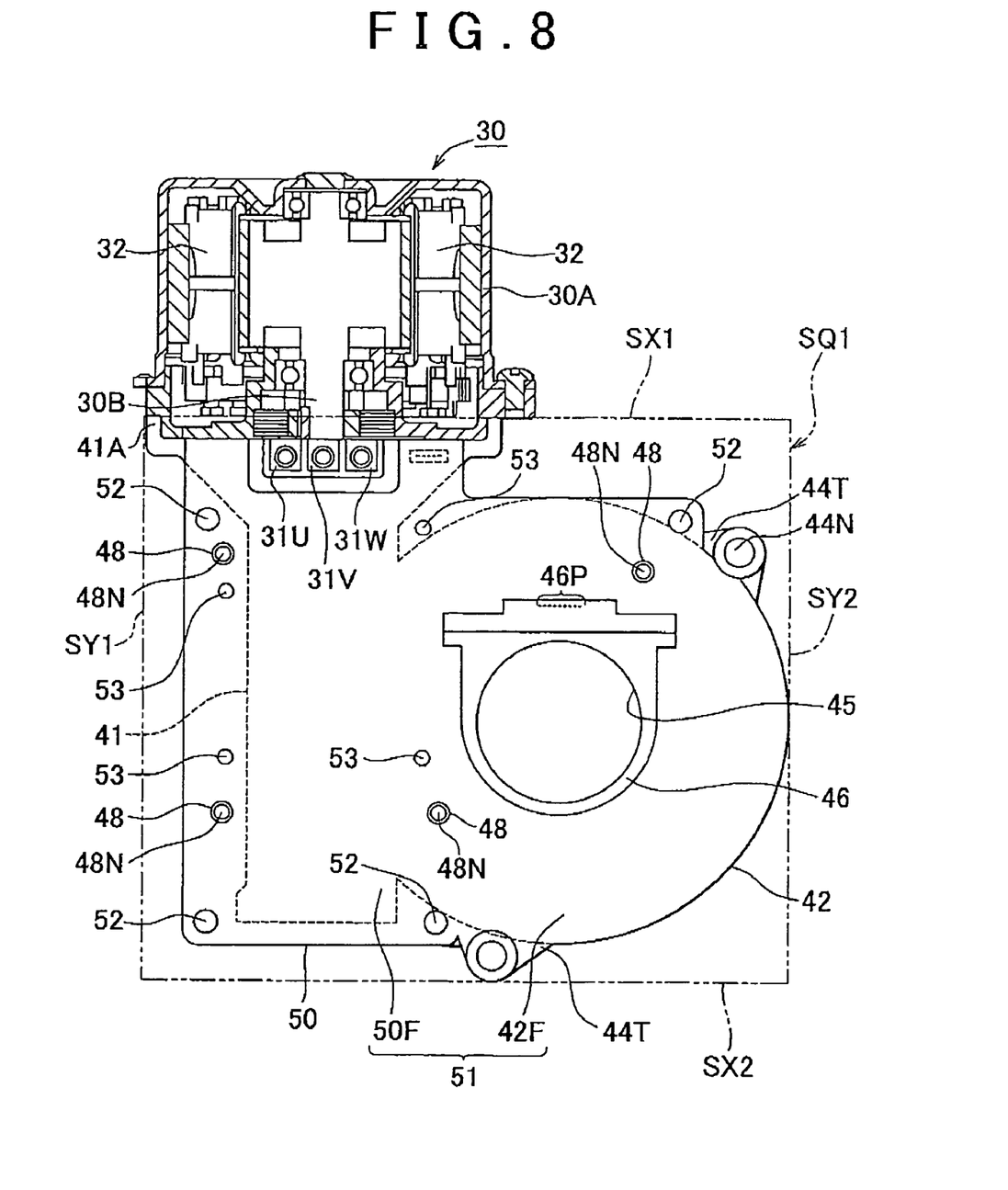
FIG. 8 is a partially sectional diagram of the electric power steering system, with the control case, the control circuit board, and an inverter circuit board removed.

As shown in FIG. 8, the control case fixation surface 51 partially projects from the outer profile of the worm gear housing portion 41 and the worm wheel housing portion 42 in the plan view with respect to the axial direction of the steering shaft 11. When the amount of such projection is too large, the mountability of the electric power steering system 10 on the vehicle 81 is impaired. In order to improve the mountability, the control case fixation surface 51 of the embodiment is sized so that the control case fixation surface 51 fits in a rectangle SQ1 that is the smallest rectangle that can be set in the plan view (FIG. 8, for example) of the gear housing 40 with respect to the axial direction of the steering shaft 11 and that has four sides, which are a pair of vertical sides SY1 and SY2 that are parallel with the rotation axis of the worm gear 19 and a pair of horizontal sides SX1 and SX2 that are perpendicular to the vertical sides SY1 and SY2, in which four sides the worm gear housing portion 41 and the worm wheel housing portion 42 are inscribed.

More specifically, the control case fixation surface 51 is inscribed in the rectangle SQ1, the four sides of which are the vertical side SY1 that the side surface of the motor-fixing cylindrical portion 41A of the worm gear housing portion 41 internally touches, the vertical side SY2 that the side surface of the worm wheel housing portion 42 internally touches, the horizontal side SX1 that the surface of the edge of the opening of the motor-fixing cylindrical portion 41A internally touches, and the horizontal side SX2 that the fixing protrusions 43T, 44T of the worm wheel housing portion 42 internally touch.

The motor drive controller 20 has a construction in which a control circuit board 21 and an inverter circuit board 22 are attached to the above-described control case fixation surface 51 and all of these components are covered with a control case 60.

Figure 6:
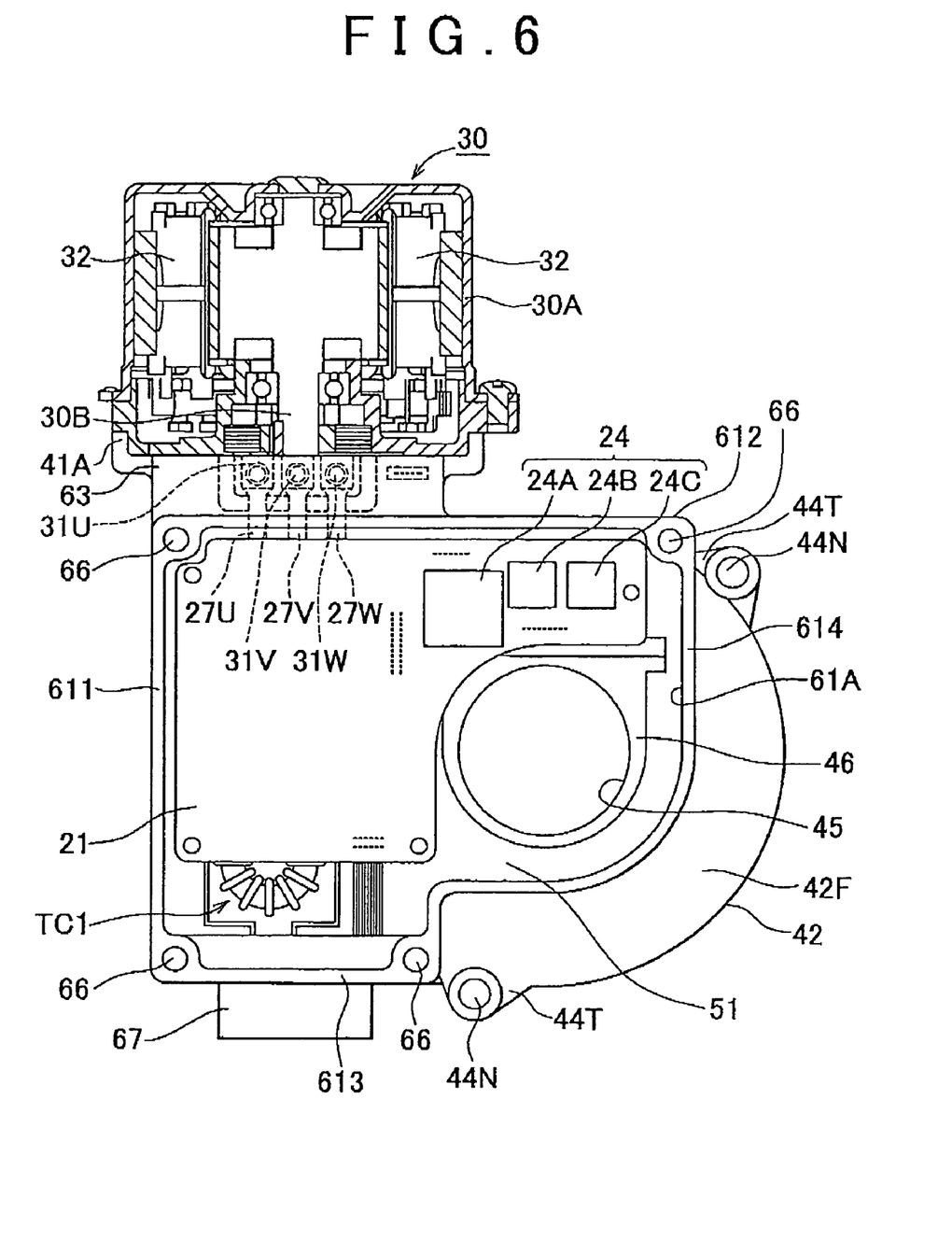
FIG. 6 is a partially sectional diagram of the electric power steering system, with a cover of a control case removed.

As shown in FIG. 6, the control circuit board 21 is provided so as to span over a worm gear housing portion 41-side region of the control case fixation surface 51 and a worm wheel housing portion 42-side region thereof. Specifically, the control circuit board 21 is substantially L-shaped so as to extend from, over the control case fixation surface 51, a position relatively close to the motor 30 in the direction parallel with the rotation axis of the worm gear 19 and in the direction perpendicular to the rotation axis of the worm gear 19. The control circuit board 21 is placed on the tip portions of a plurality of columns 48 (see FIG. 8) that stand on the control case fixation surface 51 and is fixed in a state where the control circuit board 21 is raised with respect to the control case fixation surface 51 as shown in FIG. 5 by screwing the screws, passed through the control circuit board 21, into female screw holes 48N formed in the columns 48.

A microcomputer 24, which includes a CPU 24A, a memory 24B, a custom IC 24C, etc. is implemented on a worm wheel housing portion 42-side region of the control circuit board 21. These components constitute a control circuit 21C shown in FIG. 9. Meanwhile, a connection circuit (not shown) that connects between the microcomputer 24 and a switching inverter circuit 22C (hereinafter referred to as the "inverter circuit 22C") described later is implemented on a worm gear housing portion 41-side region of the control circuit board 21.

The control circuit 21C determines the target value of the motor drive current according to the operating conditions. Specifically, the CPU 24A determines the electric current command values of the U, V, and W phases based on the detected values of the vehicle speed sensor 84, the rotational position sensor 29, and the steering angle/torque sensor 87. Pin holes are formed in the control circuit board 21 at designated positions. The terminal pins 46P of the steering angle/torque sensor 87 are inserted into the pin holes formed in a worm wheel housing portion 42-side region of the control circuit board 21, whereby the control circuit board 21 and the steering angle/torque sensor 87 are electrically connected to each other.

Figure 7:
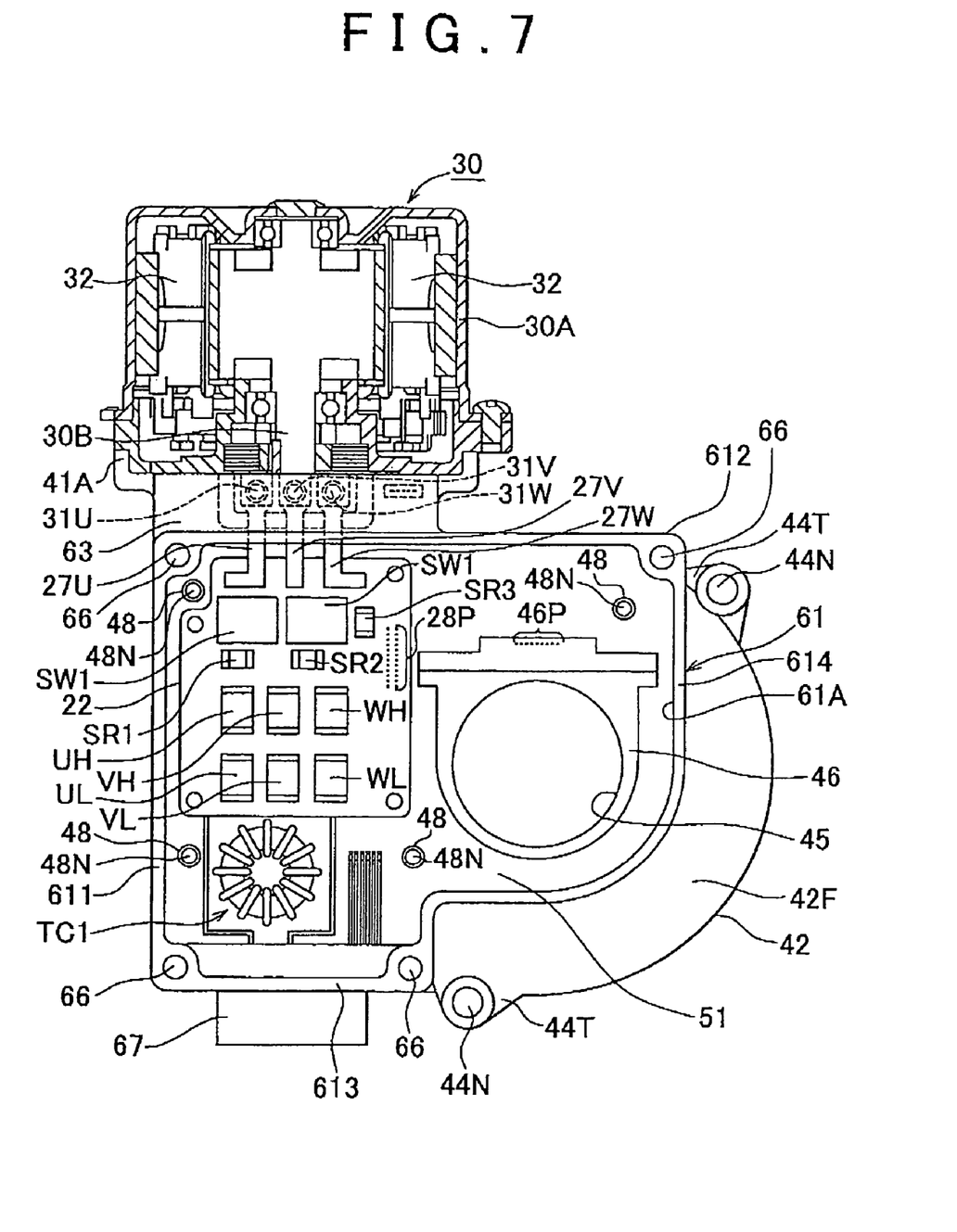
FIG. 7 is a partially sectional diagram of the electric power steering system, with the cover and a control circuit board removed.

The inverter circuit board 22 is provided unevenly over a worm gear housing portion 41-side region of the control case fixation surface 51 only as shown in FIG. 7 and is fixed in a state where the inverter circuit board 22 is in surface contact with the control case fixation surface 51 as shown in FIG. 5. The shape of the inverter circuit board 22 is substantially a rectangle that is elongated in the direction of the rotation axis of the worm gear 19 and the inverter circuit board 22 is fixed by screwing the screws (not shown), passed through the corner portions of the inverter circuit board 22, into female screw holes 53 formed in the control case fixation surface 51.

Figure 9:
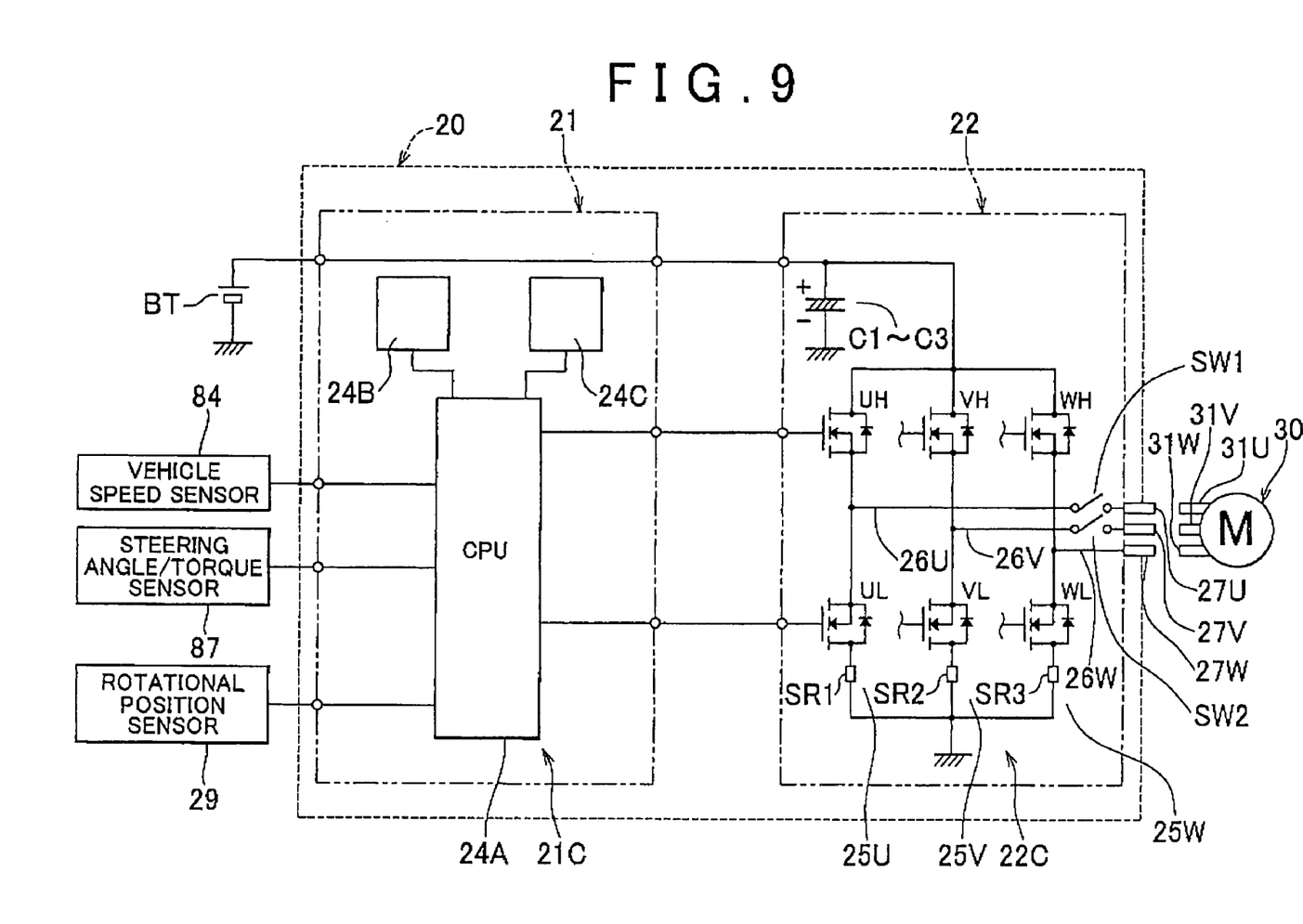
FIG. 9 is a circuit diagram of a circuit of a motor drive controller.

The inverter circuit board 22 is made by implementing the inverter circuit 22C shown in FIG. 9 on a metallic board, for example, and generates a motor drive current according to the current command value determined by the control circuit board 21. Specifically, switching elements UH, VH, WH, UL, VL, and WL, relays SW1 and SW2, shunt resistors SR1, SR2, and SR3, and electrolytic capacitors C1, C2, and C3 (see FIGS. 4 and 5), which constitute the inverter circuit 22C, are mounted on the inverter circuit board 22. In addition, a plurality of terminal pins 28P stand perpendicularly with respect to the control case fixation surface 51 to electrically connect between the inverter circuit board 22 and the control circuit board 21. The control circuit 21C and the inverter circuit 22C constitute the motor drive control circuit.

The switching elements UH, VH, WH, UL, VL, and WL are N-channel metal oxide semiconductor field-effect transistors (MOSFET), for example, and the gates of these MOSFETs are connected to the CPU 24A of the control circuit board 21 through the terminal pins 28P.

As shown in FIG. 9, the inverter circuit 22C is a three-phase bridge circuit in which U-, V-, and W-phase circuits 25U, 25V, and 25W are connected in parallel between a positive electrode of a battery BT and a negative electrode equal in voltage to GND. The switching elements UH, VH, and WH are placed on the high-voltage side of the circuits 25U, 25V, and 25W of the respective phases and the switching elements UL, VL, and WL are placed on the low-voltage side of the circuits 25U, 25V, and 25W of the respective phases. Bus bars 27U, 27V, and 27W shown in FIG. 7, which function as the "electric line", are connected to terminals of three output lines 26U, 26V, and 26W that are extended from between the high-voltage side switching elements and the low-voltage side switching elements of the U-, V-, and W-phase circuits 25U, 25V, and 25W. These bus bars 27U, 27V, and 27W are extended toward the motor 30 in parallel with the inverter circuit board 22 and the tips thereof are fixed, by screws, to terminal metal parts 31U, 31V, and 31W provided so as to be exposed to the outside of the stator 30A of the motor 30.

Turning on and off of the switching elements UH, VH, WH, UL, VL, and WL of the inverter circuit 22C is controlled by the CPU 24A in predetermined combinations so that the U-, V-, and W-phase electric currents according to the motor electric current command values are supplied to the coils of the respective phases of the motor 30, whereby the direct current output from the battery BT is output in the form of three-phase alternating current.

The relays SW1 and SW2 are placed on, among the three output lines 26U, 26V, and 26W of the inverter circuit 22C, the U-phase and V-phase output lines 26U and 26V, for example. When the ignition switch of the vehicle 81 is turned off or there is an abnormality, the relays SW1 and SW2 are turned off to interrupt the supply of electricity from the inverter circuit 22C to the motor 30. The shunt resistors SR1, SR2, and SR3 are provided between the low-voltage side switching elements UL, VL, and WL and the negative electrode of the battery BT in the circuits 25U, 25V, and 25W of the respective phases. The shunt resistors SR1, SR2, and SR3 are used to detect the electric currents that flow through the coils of the respective phases of the motor 30.

The electrolytic capacitors C1, C2, and C3 are laid between the inverter circuit board 22 and the control circuit board 21 (see FIGS. 4 and 5). The electrolytic capacitors C1, C2, and C3 absorb and smooth the ripples of the electric current caused by turning on and off of the switching elements UH, VH, and WH, . . . .

A toroidal coil TC1 for noise prevention is provided in a space over a worm gear housing portion 41-side region of the control case fixation surface 51, in which the control case fixation surface 51 is not covered with the inverter circuit board 22. The toroidal coil TC1 prevents the noise caused by turning on and off of the switching elements UH, VH, and WH, . . . from leaking out of the control case 60.

By placing the electrolytic capacitors C1, C2, and C3 transversely, it is possible to reduce the size of the gear housing 40 in the direction in which the inverter circuit board 22 and the control circuit board 21 face each other.

In addition, as shown in FIG. 4, the microcomputer 24 (the CPU 24A, the memory 24B, the custom IC 24C, etc.), provided on the control circuit board 21, and the switching elements UH, VH, WH, . . . provided on the inverter circuit board 22 are disposed at respective positions mutually shifted in the direction perpendicular to the direction in which the control circuit board 21 and the inverter circuit board 22 face each other. Specifically, the microcomputer 24 is disposed over a worm wheel housing portion 42-side region of the control case fixation surface 51 and the switching elements UH, VH, WH, . . . are disposed over a worm gear housing portion 41-side region of the control case fixation surface 51. Thus, the transmission of the heat generated by switching on and off of the switching elements UH, VH, WH, . . . to the microcomputer 24 is impeded and thus, it is possible to prevent malfunction of the microcomputer 24.

The above-described control circuit board 21 and the inverter circuit board 22 are housed in the control case 60. The control case 60 has a flat box-shaped structure as shown in FIGS. 2, 3, 10, and 11, and is attached so as to cover the control case fixation surface 51 of the gear housing 40. One end of the control case 60 in the flattening direction, that is, in the minor-axis direction, is open and the opening is closed by the control case fixation surface 51. The control case 60 covers the whole of the worm gear housing portion 41-side region of the control case fixation surface 51 and part of the worm wheel housing portion 42-side region thereof. The steering shaft 11 passes through the part of the control case 60 that covers the worm wheel housing portion 42-side region.

The sensor housing cylinder portion 46 that projects from the control case fixation surface 51 laterally covers the part of the steering shaft 11 that is positioned in the control case 60, and the control circuit board 21 and the inverter circuit board 22 are disposed outside the sensor housing cylinder portion 46. Thus, it is possible to avoid the situation where the grease applied on the steering shaft 11 and the worm speed reducing mechanism 15 flies in the control case 60 and attaches on the control circuit board 21 and the inverter circuit board 22. In addition, because the sensor housing cylinder portion 46 is made of aluminum and is integrally formed with the gear housing 40, the sensor housing cylinder portion 46 has a noise-blocking effect.

As shown in FIG. 5, the control case 60 is made by attaching a cover 70 made of an aluminum plate to a closed-loop side wall 61 made of resin. The closed-loop side wall 61 has a closed loop structure that stands upward (toward the steering wheel 88) from the control case fixation surface 51. Meanwhile, the cover 70 includes: a ceiling wall 71 that closes an upper end opening 61A, on the side distant from the control case fixation surface 51, of the closed-loop side wall 61 and faces the control case fixation surface 51; and an peripheral side wall 72 that is formed by bending the peripheral portion of the ceiling wall 71 toward the control case fixation surface 51 and covers the outer side of the closed-loop side wall 61. On the ceiling wall 71 of the cover 70, from the periphery of a shaft through hole 71A, through which the steering shaft 11 is passed, a substantially rhombus-shaped, stepped protrusion 73 is provided so as to project on the steering wheel 88 side. The closed-loop side wall 61 and the cover 70 are fixed together by an adhesive agent, for example. Because part of the control case 60 is made of resin, the weight is reduced as compared to that in which the whole of the control case 60 is made of metal. By covering the closed-loop side wall 61 with the peripheral side wall 72 made of an aluminum plate, it is possible to block noise between the inside and the outside of the control case 60.

The closed-loop side wall 61 includes: a first to third side wall portion 611 to 613 that are extended along the periphery of the control case fixation surface 51; and a fourth side wall portion 614 that is disposed further inside than the periphery of the control case fixation surface 51. Specifically, the closed-loop side wall 61 includes: the first side wall portion 611 that extends straight along the periphery of the control case fixation surface 51 that is substantially parallel with the axial direction of the worm gear 19; the second side wall portion 612 that is bent at a right angle from the end portion, on the motor 30 side, of the first side wall portion 611 toward the worm wheel housing portion 42-side region and extends straight to the position beyond the steering shaft 11; the third side wall portion 613 that is bent at a right angle from the end portion, on the side distant from the motor 30, of the first side wall portion 611 toward the worm wheel housing portion 42-side region and is shorter than the second side wall portion 612; and the fourth side wall portion 614 that connects between the second side wall portion 612 and the third side wall portion 613 and that extends on the side opposite to the first side wall portion 611 with respect to the steering shaft 11.

More specifically, the fourth side wall portion 614 is configured such that the straight portion that is bent at a right angle from the second side wall portion 612 and the straight portion that is bent at a right angle from the third side wall portion 613 are connected by a circular arc portion that circumvents the sensor housing cylinder portion 46.

In a worm gear housing portion 41-side region of the second side wall portion 612, a bus bar insertion hole 62 is formed, which functions as the "electric line insertion hole" (see FIG. 5), and through which the bus bars 27U, 27V, and 27W connecting between the inverter circuit board 22 and the motor 30 are passed. The bus bar cover wall 63, which functions as the "electric line cover wall", is formed to protrude from the edge of opening of the bus bar insertion hole 62 to the motor 30 side. The bus bar cover wall 63 covers and protects the bus bars 27U, 27V, and 27W from above and laterally.

As shown in FIG. 5, the closed-loop side wall 61 is an insert-molded part, made of resin, that has the third side wall portion 613 through which a bus bar 64 is passed. A rectangular tube-shaped connector tube wall 67 that surrounds the portion of the bus bar 64 that projects outside the closed-loop side wall 61 is formed to protrude from the outer surface of the third side wall portion 613. The end portion of the bus bar 64 that projects inside the closed-loop side wall 61 (third side wall portion 613) is connected to the motor drive controller 20. The electric power cable (not shown) that extends from the battery BT is connected to the bus bar 64.

Each of the intersections, or corners, between the side wall portions 611, 612, 613, and 614, which constitute the closed-loop side wall 61, has a fixation hole 66 formed through the closed-loop side wall 61. The closed-loop side wall 61 is fixed to the control case fixation surface 51 (the gear housing 40 and the fixation support plate 50) by screwing the screws (not shown), passed through the fixation holes 66, into the female screw holes 52 (see FIG. 8) formed in the control case fixation surface 51.

Next, a procedure for attaching the motor drive controller 20 to the gear housing 40 will be described. First, in a state shown in FIG. 8, the inverter circuit board 22 is fixed to the control case fixation surface 51 by screws and the toroidal coil TC1 is attached to the control case fixation surface 51.

Next, the bus bars 27U, 27V, and 27W that project from the inverter circuit board 22 are fixed to the terminal metal parts 31U, 31V, and 31W of the motor 30. During this step, the bus bars 27U, 27V, and 27W are exposed to the outside.

Next, the closed-loop side wall 61 of the control case 60 is placed on the control case fixation surface 51 and fixed thereto by screws. Then, the bus bars 27U, 27V, and 27W are covered with the bus bar cover wall 63 from above and laterally (the state shown in FIG. 7), the bus bar cover wall 63 being integrally formed with the closed-loop side wall 61.

Then, the control circuit board 21 is attached so as to cover the inverter circuit board 22. Specifically, the control circuit board 21 is placed on the tip portions of the plurality of columns 48 that stand on the control case fixation surface 51 and fixed to the tip portions by screws. The terminal pins 46P and 28P are inserted into the pin holes of the control circuit board 21 and electrically connected thereto.

Finally, the cover 70 is attached to close the upper end opening 61A of the closed-loop side wall 61. The above is a procedure for attaching the motor drive controller 20 to the gear housing 40.

In the electric power steering system 10 of this embodiment configured as described above, the motor drive controller 20 that has the inverter circuit board 22 and the control circuit board 21 housed in the control case 60 is provided so as to overlap the control case fixation surface 51 formed at an end portion of the gear housing 40 in the axial direction of the steering shaft 11, so that it is possible to reduce the projection in the axial direction of the motor 30 as compared to the conventional one.

In addition, the control case fixation surface 51 is sized so that the control case fixation surface 51 fits in the rectangle SQ1 that is the smallest rectangle that can be set in the plan view (FIG. 8, for example) of the gear housing 40 with respect to the axial direction of the steering shaft 11 and that has four sides, which are a pair of vertical sides SY1 and SY2 that are parallel with the rotation axis of the worm gear 19 and a pair of horizontal sides SX1 and SX2 that are perpendicular to the vertical sides SY1 and SY2, in which the worm gear housing portion 41 and the worm wheel housing portion 42 are inscribed. Thus, the control case fixation surface 51 does not become too large as compared to the case where a conventional gear housing is viewed in the axial direction of the steering shaft 11. Accordingly, the mountability onto the vehicle 81 is not impaired.

In addition, a metallic board is used for the inverter circuit board 22 and the inverter circuit board 22 is fixed to the control case fixation surface 51 so as to be in surface contact therewith, so that it is possible to efficiently dissipate the heat generated on the inverter circuit board 22 into the gear housing 40 and the fixation support plate 50.

The invention is not limited to the above embodiment. For example, embodiments described below are also included in the technical scope of the invention. In addition, the invention can be variously modified for implementation within the scope not departing from the gist of the invention, in the modes other than those described below.

(1) Although in the above embodiment, the outer side of the closed-loop side wall 61 made of resin is covered with the peripheral side wall 72 of the cover 70 that is formed of an aluminum plate, the closed-loop side wall 61 may be formed of a resin that has a noise-blocking effect. With this configuration, it is possible to eliminate the peripheral side wall 72 of the cover 70 and use the cover 70 made up of the ceiling wall 71 only and thus, it is possible to reduce the weight.

(2) Although in the above embodiment, the control case fixation surface 51 is formed on the steering wheel 88 side in the axial direction of the steering shaft 11 in the gear housing 40, the control case fixation surface 51 may be disposed on the side opposite to the steering wheel 88 side, that is, on the pinion 86 side.

(3) Although in the above embodiment, the control case 60 covers the control case fixation surface 51 in the entire region on the worm gear housing portion 41 side and in part of the region on the worm wheel housing portion 42 side, the control case 60 may cover the control case fixation surface 51 over the worm gear housing portion 41-side region only or may cover the entire control case fixation surface 51.

Figure 11:
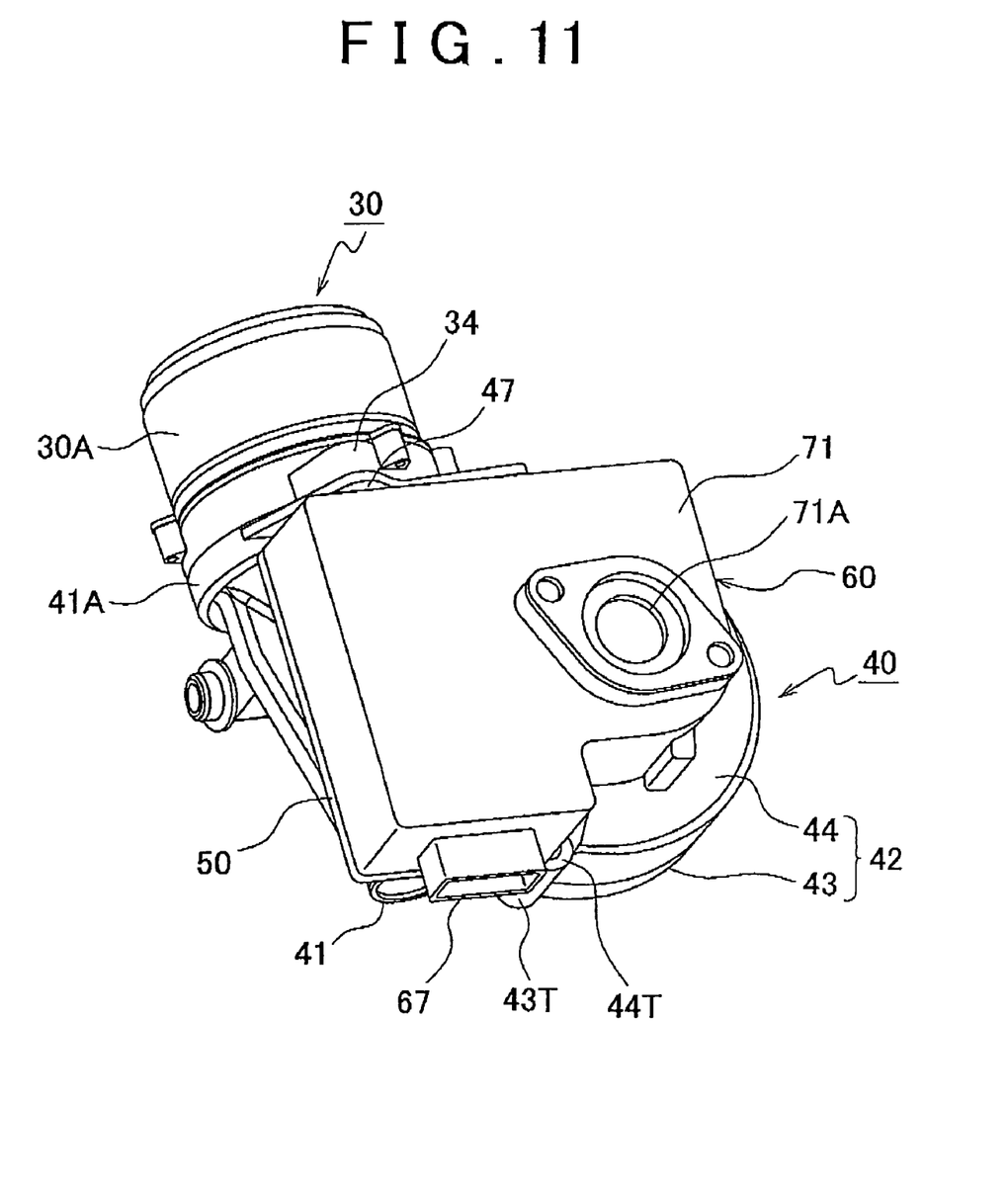
FIG. 11 is a perspective view of the electric power steering system.

(4) Although in the above embodiment, the planar plate 90 is integrally formed with the worm gear housing portion 41, the plate 90 may be eliminated to reduce the weight (see FIGS. 10 and 11).

What is claimed is:

1. An electric power steering system comprising:
a rotary shaft that rotates with a steering wheel of a vehicle;
a worm speed reducing mechanism, provided at a middle portion of the rotary shaft, the worm speed reducing mechanism including a worm wheel and a worm gear meshing with the worm wheel;
a mechanism housing that includes a first housing portion that covers the worm wheel and a second housing portion that covers the worm gear, the second housing portion being integrally formed with the first housing portion on a side portion of the first housing portion;
an alternating-current motor that drives the worm gear, the alternating-current motor being disposed coaxially with the worm gear and fixed to an end portion of the second housing portion;
a motor drive control circuit that includes a switching inverter circuit, connected to a power line of the alternating-current motor, and that controls drive of the alternating-current motor; and
a control case that houses the motor drive control circuit, wherein:

the mechanism housing has a control case fixation surface, on which the control case is fixed, at an end portion of the mechanism housing in an axial direction of the rotary shaft, wherein the control case fixation surface is sized so that the control case fixation surface fits in a rectangle that is the smallest rectangle that can be set in a plan view of the mechanism housing with respect to the axial direction of the rotary shaft and that has four sides, which are a pair of vertical sides that are parallel with a rotation axis of the worm gear and a pair of horizontal sides that are perpendicular to the vertical sides, in which four sides the first housing portion and the second housing portion are inscribed, the control case includes:
- a loop-structured, closed-loop side wall that stands on the control case fixation surface; and
- a ceiling wall that closes an end portion opening, on a side distant from the control case fixation surface, of the closed-loop side wall;
- an inverter circuit board, on which the switching inverter circuit is implemented, is fixed so as to be placed on the control case fixation surface; and
- a shaft insertion hole, through which the rotary shaft is passed, is formed in the ceiling wall.

2. The electric power steering system according to claim 1, wherein the mechanism housing has a plurality of columns that stand on the control case fixation surface, and a control circuit board, on which a control circuit to control turning on and off of switching elements of the switching inverter circuit is implemented, is fixed to tip portions of the plurality of columns and held in a state where the control circuit board is raised with respect to the control case fixation surface.

3. The electric power steering system according to claim 2, wherein the control circuit board has a microcomputer, and the microcomputer and the switching elements on the inverter circuit board are disposed at respective positions mutually shifted in a direction perpendicular to a direction in which the control circuit board and the inverter circuit board face each other.

4. The electric power steering system according to claim 3, wherein the closed-loop side wall includes:

a first side wall portion that extends along a periphery of a second housing portion-side region of the control case fixation surface, the periphery extending in a longitudinal direction of the second housing portion;

a second side wall portion that is bent at a right angle from an end portion, on the alternating-current motor side, of the first side wall portion;

a third side wall portion that is bent at a right angle from an end portion, on a side distant from the alternating-current motor, of the first side wall portion; and a fourth side wall portion that connects between an end portion of the second side wall portion and an end portion of the third side wall portion and that is at least partially positioned on a first housing portion side region of the control case fixation surface.

5. The electric power steering system according to claim 4, wherein a corner portion of the inverter circuit board is positioned in conformity with an inner side of a corner portion at which the first side wall portion and second side wall portion of the closed-loop side wall intersect, an electric line insertion hole, through which an electric line for connecting between the alternating-current motor and the inverter circuit board is passed, is formed in the second side wall portion, and an electric line cover wall that extends from an edge of an opening of the electric line insertion hole to the alternating-current motor side and covers the electric line.

6. The electric power steering system according to claim 4, wherein the second side wall portion is bent at a right angle from the first side wall portion and extends to a position beyond the rotary shaft in the first housing portion-side region, the fourth side wall portion connects between the second side wall portion and the third side wall portion and extends on a side opposite to the first side wall portion with respect to the rotary shaft, and the control circuit board or the inverter circuit board has an L shape that extends along the first side wall portion and the second side wall portion.

7. The electric power steering system according to claim 4, wherein a shaft middle portion surrounding wall that projects from the control case fixation surface and laterally covers a middle portion of the rotary shaft is disposed inside the closed-loop side wall.

8. The electric power steering system according to claim 1, wherein the closed-loop side wall is a molded resin part and fixed to the mechanism housing.

9. The electric power steering system according to claim 1, wherein the closed-loop side wall is an insert-molded resin part, through which a bus bar is passed, and is provided with a connector tube wall that projects from an outer surface of the closed-loop side wall and surrounds the bus bar, and the bus bar is connected to the motor drive control circuit inside the closed-loop side wall.

10. The electric power steering system according to claim 1, wherein the mechanism housing and the control case each comprises an electrically conductive member to block noise between an inside and an outside of the control case.

11. The electric power steering system according to claim 1, wherein the inverter circuit board is a metallic board.

* * * * *